(12) United States Patent
Christensen

(10) Patent No.: US 8,886,451 B2
(45) Date of Patent: Nov. 11, 2014

(54) HEARING DEVICE PROVIDING SPOKEN INFORMATION ON THE SURROUNDINGS

(75) Inventor: Søren Christensen, Kirke Hyllinge (DK)

(73) Assignee: GN Store Nord A/S, Ballerup (DK)

( * ) Notice: Subject to any disclaimer, the term of this patent is extended or adjusted under 35 U.S.C. 154(b) by 38 days.

(21) Appl. No.: 13/559,496

(22) Filed: Jul. 26, 2012

(65) Prior Publication Data

US 2014/0019037 A1 Jan. 16, 2014

(30) Foreign Application Priority Data

Jul. 12, 2012 (EP) .................................... 12176120

(51) Int. Cl.
| | |
|---|---|
| *G01C 21/00* | (2006.01) |
| *G01C 21/36* | (2006.01) |
| *H04W 4/02* | (2009.01) |
| *G01C 21/20* | (2006.01) |
| *H04S 7/00* | (2006.01) |

(52) U.S. Cl.
CPC ................. *G01C 21/00* (2013.01); *H04S 7/304* (2013.01); *G01C 21/3629* (2013.01); *G01C 21/3679* (2013.01); *H04W 4/02* (2013.01); *G01C 21/20* (2013.01)
USPC ............................ 701/409; 701/488; 701/491

(58) Field of Classification Search
CPC ........... G01C 21/3629; G01C 21/3679; G01C 21/00; G01C 21/20; H04W 4/026; H04S 2400/09; H04S 7/304
USPC ......... 701/409, 412, 418, 419, 426, 431, 438, 701/488, 491

See application file for complete search history.

(56) References Cited

U.S. PATENT DOCUMENTS

| | | | |
|---|---|---|---|
| 6,401,028 B1 * | 6/2002 | Kamiya et al. ................. | 701/441 |
| 2003/0036848 A1 | 2/2003 | Sheha et al. | |
| 2005/0096843 A1 | 5/2005 | Del Monte, Jr. | |
| 2005/0280519 A1 * | 12/2005 | Nagata .......................... | 340/435 |
| 2009/0094257 A1 | 4/2009 | Nissen | |
| 2010/0057571 A1 | 3/2010 | Yamamoto et al. | |
| 2011/0137437 A1 | 6/2011 | Jonsson | |
| 2011/0206217 A1 | 8/2011 | Weis | |

FOREIGN PATENT DOCUMENTS

WO 93/22493 11/1993

OTHER PUBLICATIONS

Extended European Search Report dated Dec. 11, 2012 for EP Patent Application No. 12176120.9, 7 pages.

\* cited by examiner

*Primary Examiner* — Gertrude Arthur Jeanglaude
(74) *Attorney, Agent, or Firm* — Vista IP Law Group, LLP

(57) ABSTRACT

A navigation system includes a hearing device configured to be head worn and having loudspeakers for emission of sound towards ears of a user; a GPS unit for determining a geographical position of the system; a sound generator connected for outputting audio signals to the loudspeakers; and a processor configured for selecting Points-Of-Interest in a vicinity of the system, and controlling the sound generator to output the audio signals that represents spoken information on the selected Points-Of-Interest in sequence.

16 Claims, 8 Drawing Sheets (a)

(b)

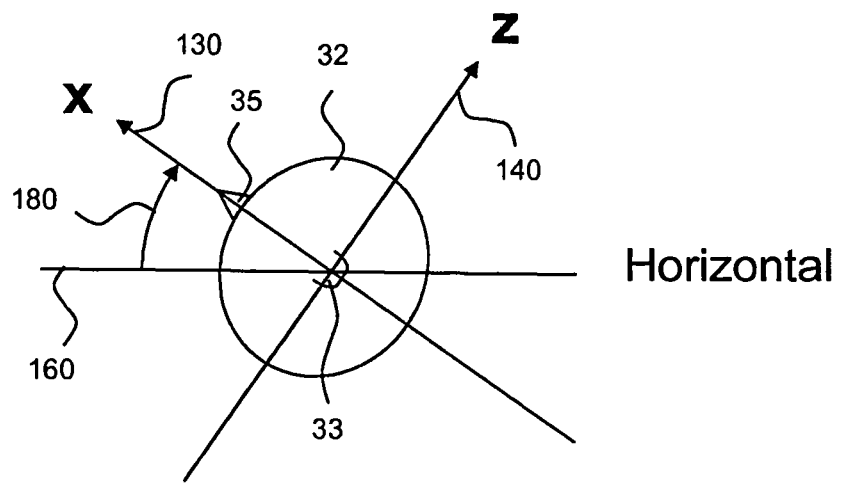
(a)
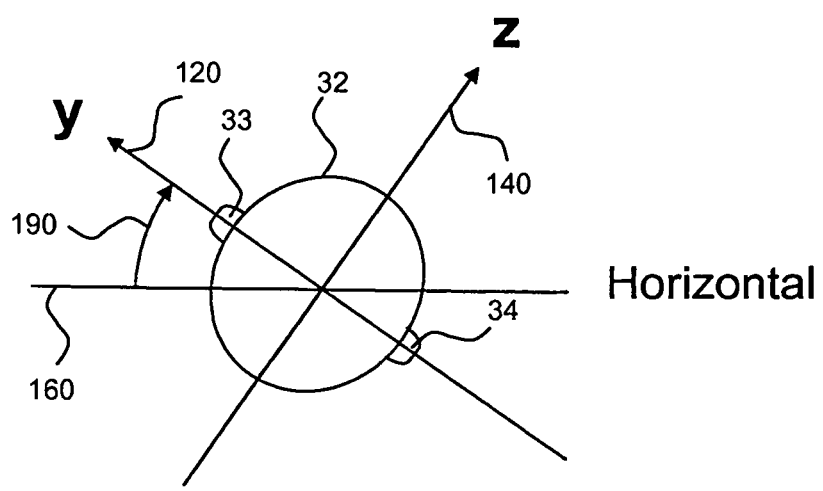
(b)
Fig. 3

HEARING DEVICE PROVIDING SPOKEN INFORMATION ON THE SURROUNDINGS

RELATED APPLICATION DATA

This application claims priority to, and the benefit of, European Patent Application No. EP 12176120.9, filed on Jul. 12, 2012, pending, the entire disclosure of which is expressly incorporated by reference herein.

FIELD

A new personal navigation system is provided, comprising a GPS-unit and a hearing device having an inertial measurement unit for determination of orientation of a user's head and configured to emit spoken information on points of interest in the vicinity of the user of the personal navigation system.

BACKGROUND

Typically, present GPS-units guide a user towards a desired destination using visual and audible guiding indications. For example, present GPS-units typically displays a map on a display screen that includes the current position of the user, typically at the centre of the displayed map, and a suitable route drawn on the displayed map towards a desired destination accompanied by spoken instructions, such as "turn left at the next junction".

Conventional GPS-units typically includes a database with a variety of particular locations denoted points-of-interests or POIs. POIs are typically shown on the map with an icon indication the particular type of the POI in question at the geographical position of the POI.

Typically, POI categories include: Restaurants, Hotels, Shopping Centres, Industrial Estates, Police Stations, Post Offices, Banks, ATMs, Hospitals, Pharmacies, Schools, Churches, Golf Courses, Low Bridges, Historic Sites, Camping & Caravan Sites, etc.

Typically, the POI database includes information on POIs, such as the type of POI, the name of the POI, longitude and latitude of the POI, the address of the POI, possible phone numbers, etc.

Some conventional GPS-units are configured for containing audio tours guiding the user along a specific route with MP3 audio files associated with respective POIs along the route and played automatically when the GPS-unit is within a certain distance from the POI in question. The audio tours with MP3 audio files are downloaded into the GPS-unit beforehand.

SUMMARY

A method of navigation is provided comprising the steps of determining the geographical position of a person with a GPS unit,
selecting Points-Of-Interests in the vicinity of the user, and
controlling a loudspeaker worn by the user to output spoken information on the selected Points-Of-Interests.

A personal navigation system is provided, comprising
a hearing device configured to be head worn and having loudspeakers for emission of sound towards the ears of a user,
a GPS unit for determining the geographical position of the system,
a sound generator connected for outputting audio signals to the loudspeakers, and
a processor configured for
selecting Points-Of-Interests in the vicinity of the system, and
controlling the sound generator to output audio signals with spoken information on the selected Points-Of-Interests in sequence.

The hearing device may accommodate an inertial measurement unit positioned for determining head yaw, when a user wears the hearing device in its intended operational position on the user's head.

The personal navigation system may comprise one or more pairs of filters with Head-Related Transfer Functions selectively connected in parallel between the sound generator and the loudspeakers for generation of a binaural acoustic sound signal emitted towards the eardrums of the user and perceived by the user as coming from a sound source positioned in a direction corresponding to the respective Head-Related Transfer Function.

The processor may be configured for determining directions towards each of the selected Points-Of-Interests with relation to the determined geographical position and head yaw of the user, selecting pairs of filters with Head-Related Transfer Functions corresponding to the determined directions, and controlling the sound generator for sequentially outputting audio signals with spoken information on the selected Points-Of-Interests in sequence through the respective selected pairs of filters so that the user hears spoken information on the Points-Of-Interests from the respective directions towards the Points-Of-Interests.

Thus, a personal navigation system is provided that relies on communication to the user of audible information on the surroundings of the user. The information is communicated with the hearing device, preferably with a sense of direction so that audible information relating to a specific site proximate the user will be perceived by the user to be emitted by a sound source located at the site in question.

For example, the user may arrive at a historical site, such as a town square, with many sites of interest. With a user interface of the personal navigation system, the user may then request the personal navigation system to provide an introduction to the site at the town square, and the user may specify the types of POIs of interest to the user, e.g. historical sites. In response to the user request, the personal navigation system then identifies the relevant POIs, and sequentially narrates information on the identified POIs, and the narrator will sequentially be perceived to be positioned at the respective POIs.

In this way, the user is provided with spatial knowledge about the surroundings and the need to visually consult a display of the surroundings is minimized making it easy and convenient for the user to navigate to geographical locations, the user desires to see or visit.

The user may then request the personal navigation system to guide the user to a selected geographical position, such as a selected POI from the POIs just presented in sequence to the user. Thus, preferably the processor is also configured for determining a direction towards a selected geographical destination with relation to the determined geographical position and head yaw of the user, and controlling the sound generator to output audio signals guiding the user, and selecting a pair of tilters with a Head-Related Transfer function corresponding to the determined direction towards the selected geographical destination so that the user perceives to hear sound arriving from a sound source located in the determined direction.

The personal navigation system may contain a database of POIs in a way well-known in conventional hand-held GPS-units.

Some or all of the POI records of the database of the personal navigation system include audio files with spoken information on the respective POI.

Alternatively, or additionally, the personal navigation system may have access to remote servers hosting databases on POIs, e.g. through a Wide-Area-Network, or a Local Area Network, e.g. providing access to the Internet.

Thus, the personal navigation system may have a wireless antenna, transmitter, and receiver for communicating over a wireless network with a remote server accommodating a database with information on POIs, e.g. including audio files with spoken information on some or all of the POIs. The wireless network may be a mobile telephone network, such as the GSM network.

The wireless network may provide a link through an Internet gateway to the Internet.

The personal navigation system may transmit the current position of the system to the remote server and requesting information on nearby POIs, preferably of one or more selected categories, and preferably sequenced in accordance with a selected rule of priority, such as proximity, popularity, user ratings, professional ratings, cost of entrance, opening hours with relation to actual time, etc. A maximum number of POIs may also be specified.

The server searches for matching POIs and transmits the matching records, e.g. including audio files, to the personal navigation system that sequentially presents spoken information on the matching POIs with the hearing instrument.

In the same way, the personal navigation system may communicate with a navigation enabled remote server and request navigation tasks to be performed by the remote navigation enabled server instead of performing the navigation tasks locally by the personal navigation system. The personal navigation system may communicate position data of the current position, e.g. current longitude, latitude; or, the received satellite signals, and position data of a destination, e.g. longitude, latitude; or street address, etc., to the navigation enabled server that performs the requested navigation tasks and transmits resulting data to the personal navigation system for presentation to the user.

The hearing device comprises one small loudspeaker, or a pair of small loudspeakers, designed to be held in place close to the users ears. The loudspeaker, or pair of loudspeakers, is connected to the sound generator. The inertial measurement unit, or part of the inertial measurement unit, may be accommodated in a housing together with one loudspeaker of the hearing device; or, the inertial measurement unit may have parts accommodated in separate housings, each of which accommodates one of the pair of loudspeakers.

The hearing device may be an Ear-Hook, In-Ear, On-Ear, Over-the-Ear, Behind-the-Neck, Helmet, Headguard, etc, headset, headphone, earphone, earbud, ear defender, earmuff, etc.

Further, the hearing device may be a hearing aid, e.g. a binaural hearing aid, such as a BTE, a RIE, an ITE, an ITC, a CIC, etc, binaural hearing aid.

The hearing device may have a headband carrying two earphones. The headband is intended to be positioned over the top of the head of the user as is well-known from conventional headsets and headphones with one or two earphones. The inertial measurement unit, or part of the inertial measurement unit, may be accommodated in the headband of the hearing device.

The hearing device may have a neckband carrying two earphones. The neckband is intended to be positioned behind the neck of the user as is well-known from conventional neckband headsets and headphones with one or two earphones. The inertial measurement unit, or part of the inertial measurement unit, may be accommodated in the neckband of the hearing device.

The personal navigation system may also comprise a hand-held device, such as a GPS-unit, a smart phone, e.g. an Iphone, an Android phone, etc, e.g. with a GPS-unit, etc, interconnected with the hearing device.

The hearing device may comprise a data interface for transmission of data from the inertial measurement unit to the hand-held device.

The data interface may be a wired interface, e.g. a USB interface, or a wireless interface, such as a Bluetooth interface, e.g. a Bluetooth Low Energy interface.

The hearing device may comprise an audio interface for reception of an audio signal from the hand-held device.

The audio interface may be a wired interface or a wireless interface.

The data interface and the audio interface may be combined into a single interface, e.g. a USB interface, a Bluetooth interface, etc.

The hearing device may for example have a Bluetooth Low Energy data interface for exchange of head jaw values and control data between the hearing device and the hand-held device, and a wired audio interface for exchange of audio signals between the hearing device and the hand-held device.

Based on received head yaw values, the hand-held device can display maps on the display of the hand-held device in accordance with orientation of the head of the user as projected onto a horizontal plane, i.e. typically corresponding to the plane of the map. For example, the map may be displayed with the position of the user at a central position of the display, and the current head x-axis pointing upwards.

Selected Points-Of-Interests may also be indicated on the displayed map in addition to the spoken information presented to the user. Additional Points-Of-Interest for which spoken information is not presented to the user may also be displayed on the map, preferably with icons that distinguishes these Points-Of-Interest from the selected Points-Of-Interest.

A user interface of the hand-held device may constitute the user interface of the personal navigation system or a part of the user interface of the personal navigation system.

For example, the user may use the user interface of the hand-held device to select a specific Point-Of-Interest that the user desires to visit in a way well-known from prior art hand-held GPS-units.

The user may calibrate directional information by indicating when his or her head x-axis is kept in a known direction, for example by pushing a certain push button when looking due North, typically True North. The user may obtain information on the direction due True North, e.g. from the position of the Sun on a certain time of day, or the position of the North Star, or from a map, etc.

The hand-held device may display maps with a suggested route to the desired geographical destination as a supplement to the aural guidance provided by the personal navigation system. The hand-held device may further transmit spoken guiding instructions to the hearing device through the audio interface as is well-known in the art, supplementing the other audio signals provided by the personal navigation system.

The hand-held device may accommodate the sound generator of the personal navigation system.

The hand-held device may accommodate the processor, or parts of the processor, of the personal navigation system.

The hand-held device may accommodate all or some of the one or more pairs of filters with Head-Related Transfer Functions of the personal navigation system.

The hand-held device may accommodate a database with POIs and with audio files containing spoken, e.g. narrated, information on some or all of the respective POIs.

The hand-held device may accommodate the text-to-speech processor for converting text information on POIs into spoken information on the POIs.

The hand-held device may accommodate the interface of the personal navigation system for connection with a Wide-Area-Network and/or a Local-Area-Network.

For example, the hand-held device may have the wireless antenna, transmitter, and receiver of the personal communication system for communicating over a wireless network with a remote server accommodating a database with information on POIs, e.g. including audio files with spoken information on some or all of the POIs. The wireless network may be a mobile telephone network, such as the GSM network.

The hand-held device may accommodate the processor that is configured for requesting information on a particular Point-Of-Interest via the Wide-Area-Network and/or Local-Area-Network, and for receiving the information via the network.

The hearing device may have a microphone for reception of spoken commands by the user, and the processor may be configured for decoding of the spoken commands and for controlling the personal navigation system to perform the actions defined by the respective spoken commands.

The hearing device may comprise an ambient microphone for receiving ambient sound for user selectable transmission towards at least one of the ears of the user.

In the event that the hearing device provides a sound proof, or substantially, sound proof, transmission path for sound emitted by the loudspeaker(s) of the hearing device towards the ear(s) of the user, the user may be acoustically disconnected in an undesirable way from the surroundings. This may for example be dangerous when moving in traffic.

The hearing device may have a user interface, e.g. a push button, so that the user can switch the microphone on and off as desired thereby connecting or disconnecting the ambient microphone and one loudspeaker of the hearing device.

The hearing device may have a mixer with an input connected to an output of the ambient microphone and another input connected to an output of the sound generator, and an output providing an audio signal that is a weighted combination of the two input audio signals.

The user input may further include means for user adjustment of the weights of the combination of the two input audio signals, such as a dial, or a push button for incremental adjustment.

The hearing device may have a threshold detector for determining the loudness of the ambient signal received by the ambient microphone, and the mixer may be configured for including the output of the ambient microphone signal in its output signal only when a certain threshold is exceeded by the loudness of the ambient signal.

Further ways of controlling audio signals from an ambient microphone and a voice microphone is disclosed in US 2011/0206217 A1.

The personal navigation system also has a GPS-unit for determining the geographical position of the user based on satellite signals in the well-known way. Hereby, the personal navigation system can provide the user's current geographical position based on the GPS-unit and the orientation of the user's head based on data from the hearing device.

Throughout the present disclosure, the term GPS-unit is used to designate a receiver of satellite signals of any satellite navigation system that provides location and time information anywhere on or near the Earth, such as the satellite navigation system maintained by the United States government and freely accessible to anyone with a GPS receiver and typically designated "the GPS-system", the Russian GLObal NAvigation Satellite System (GLONASS), the European Union Galileo navigation system, the Chinese Compass navigation system, the Indian Regional Navigational Satellite System, etc, and also including augmented GPS, such as StarFire, Omnistar, the Indian GPS Aided Geo Augmented Navigation (GAGAN), the European Geostationary Navigation Overlay Service (EGNOS), the Japanese Multi-functional Satellite Augmentation System (MSAS), etc.

In augmented GPS, a network of ground-based reference stations measure small variations in the GPS satellites' signals, correction messages are sent to the GPS-system satellites that broadcast the correction messages back to Earth, where augmented GPS-enabled receivers use the corrections while computing their positions to improve accuracy. The International Civil Aviation Organization (ICAO) calls this type of system a satellite-based augmentation system (SBAS).

Like the inertial measurement unit, the GPS-unit may be accommodated in the hearing device for determining the geographical position of the user, when the user wears the hearing device in its intended operational position on the head, based on satellite signals in the well-known way. Hereby, the user's current position and orientation can be provided to the user based on data from the hearing device.

Alternatively, the GPS-unit may be included in the hand-held device that is interconnected with the hearing device. The hearing device may accommodate a GPS-antenna that is connected with the GPS-unit in the hand-held device, whereby reception of GPS-signals is improved in particular in urban areas where, presently, reception of GPS-signals by hand-held GPS-units can be difficult.

The inertial measurement unit may also have a magnetic compass for example in the form of a tri-axis magnetometer facilitating determination of head yaw with relation to the magnetic field of the earth, e.g. with relation to Magnetic North.

The sound generator of the personal navigation system is connected for outputting audio signals to the loudspeakers via the one or more pairs of filters with respective Head-Related Transfer Functions and connected in parallel between the sound generator and the loudspeakers for generation of a binaural acoustic sound signal emitted towards the eardrums of the user. In this way, sound from the hearing device will be perceived by the user as coming from a sound source positioned in a direction corresponding to the respective Head-Related Transfer Function of the current pair of filters.

The Head-Related Transfer Function of the pair of filters simulates the transmission of sound from a sound source located in a specific position to each of the two eardrums of the user.

Preferably, the one or more pairs of filters comprise digital filters with registers holding the filter coefficients. Thus, the filter coefficients of a selected Head-Related Transfer Function are loaded into the appropriate pair of registers and the respective pair of filters operates to filter with transfer functions of the selected Head-Related Transfer Function. In this way, several or all of the Head-Related Transfer Functions may be provided by a single pair of filters by loading appropriate filter coefficients into their registers.

The input to the user's auditory system consists of two signals, namely sound pressures at the left eardrum and sound pressures at the right eardrum, in the following termed the binaural sound signals. Thus, if sound pressures are accurately reproduced at the eardrums, the human auditory system will not be able to distinguish the reproduced sound pressures from sound pressures originated from a 3-dimensional spatial sound field.

It is not fully known how the human auditory system extracts information about distance and direction to a sound source, but it is known that the human auditory system uses a number of cues in this determination. Among the cues are spectral cues, reverberation cues, interaural time differences (ITD), interaural phase differences (IPD) and interaural level differences (ILD).

The transmission of a sound wave from a sound source positioned at a given direction and distance in relation to the left and right ears of the listener is described in terms of two transfer functions, one for the left ear and one for the right ear, that include any linear distortion, such as coloration, interaural time differences and interaural spectral differences. Such a set of two transfer functions, one for the left ear and one for the right ear, is called a Head-Related Transfer Function (HRTF). Each transfer function of the HRTF is defined as the ratio between a sound pressure p generated by a plane wave at a specific point in or close to the appertaining ear canal ($p_L$ in the left ear canal and $p_R$ in the right ear canal) in relation to a reference. The reference traditionally chosen is the sound pressure $p_I$ that would have been generated by a plane wave at a position right in the middle of the head with the listener absent.

The HRTF changes with direction and distance of the sound source in relation to the ears of the listener. It is possible to measure the HRTF for any direction and distance and simulate the HRTF, e.g. electronically, e.g. by pair of filters. If such pair of filters are inserted in the signal path between a playback unit, such as a media player, e.g. an Ipod®, and headphones used by a listener, the listener will achieve the perception that the sounds generated by the headphones originate from a sound source positioned at the distance and in the direction as defined by the HRTF simulated by the pair of filters, because of the approximately true reproduction of the sound pressures in the ears.

The HRTF contains all information relating to the sound transmission to the ears of the listener, including diffraction around the head, reflections from shoulders, reflections in the ear canal, etc., and therefore, due to the different anatomy of different individuals, the HRTFs are different for different individuals.

However, it is possible to provide general HRTFs which are sufficiently close to corresponding individual HRTFs for users in general to obtain the same sense of direction of arrival of a sound signal that has been filtered with pair of filters with the general HRTFs as of a sound signal that has been filtered with the corresponding individual HRTFs of the individual in question.

General HRTFs are disclosed in WO 93/22493.

For some directions of arrival, corresponding HRTFs may be constructed by approximation, for example by interpolating HRTFs corresponding to neighbouring angles of sound incidence, the interpolation being carried out as a weighted average of neighbouring HRTFs, or an approximated HRTF can be provided by adjustment of the linear phase of a neighbouring HTRF to obtain substantially the interaural time difference corresponding to the direction of arrival for which the approximated HRTF is intended.

For convenience, the pair of transfer functions of a pair of filters simulating an HRTF is also denoted a Head-Related Transfer Function even though the pair of filters can only approximate an HRTF.

Electronic simulation of the HRTFs by a pair of filters causes sound to be reproduced by the hearing device in such a way that the user perceives sound sources to be localized outside the head in specific directions. Thus, sound reproduced with pairs of filters with a HRTF makes it possible to guide the user in a certain direction.

For example, sound can be reproduced with an HRTF corresponding to the direction towards a desired geographical destination, so that the user perceives the sound source to be located and operated like a sonar beacon at the desired geographical destination. Thus, the personal navigation system utilizes a virtual sonar beacon located at the desired geographical destination to guide the user to the desired geographical destination. The virtual sonar beacon operates until the user reaches the geographical position or is otherwise aborted by the user.

The sonar beacon may emit any sound suitable for guidance of the user, including music and speech.

In this way, the user is relieved from the task of watching a map in order to follow a suitable route towards the desired geographical destination.

The user is also relieved from listening to spoken commands intending to guide the user along a suitable route towards the desired geographical destination.

Further, the user is free to explore the surroundings and for example walk along certain streets as desired, e.g. act on impulse, while listening to sound perceived to come from the direction toward the desired geographical destination (also) to be visited, whereby the user is not restricted or urged to follow a specific route determined by the navigation system.

The sound generator may output audio signals representing any type of sound suitable for this purpose, such as speech, e.g. from an audio book, radio, etc, music, tone sequences, etc.

The sound generator may output a tone sequence, e.g. of the same frequency, or the frequency of the tones may be increased or decreased with distance to the desired geographical destination. Alternatively, or additionally, the repetition rate of the tones may be increased or decreased with distance to the desired geographical destination.

The user may for example decide to listen to a radio station while walking, and the sound generator generates audio signals originating from the desired radio station filtered by the HRTF in question, so that the user perceives to hear the desired radio station as a sonar beacon located at the desired geographical destination to be visited at some point in time.

The user may decide to follow a certain route determined and suggested by the personal navigation system, and in this case the processor controls the pair of filters so that the audio signals from the sound generator are filtered by HRTFs corresponding to desired directions along streets or other paths along the determined route. Changes in indicated directions will be experienced at junctions and may be indicated by increased loudness or pitch of the sound. Also in this case, the user is relieved from having to consult a map in order to be able to follow the determined route.

The personal navigation system may be operated without a visual display, and thus without displayed maps to be consulted by the user, rather the user specifies desired geographical destinations with spoken commands and receives aural guidance by sound emitted by the hearing device in such a way that the sound is perceived by the user as coming from the direction towards the desired geographical destination.

Thus, the personal navigation system may operate without a hand-held device, and rely on aural user interface using spoken commands and aural guidance, including spoken messages.

In this case, the personal navigation system comprises a hearing device configured to be head worn and having loudspeakers for emission of sound towards the ears of a user and accommodating an inertial measurement unit positioned for determining head yaw, when the user wears the hearing device in its intended operational position on the user's head, a GPS unit for determining the geographical position of the user, a sound generator connected for outputting audio signals to the loudspeakers, pair of filters with Head-Related Transfer Functions connected in parallel between the sound generator and the loudspeakers for generation of a binaural acoustic sound signal emitted towards the eardrums of the user and perceived by the user as coming from a sound source positioned in a direction corresponding to the respective Head-Related Transfer Function, and a processor configured for determining a direction towards a desired geographical destination with relation to the determined geographical position and head yaw of the user, controlling the sound generator to output audio signals, and selecting a Head-Related Transfer function for the pair of filters corresponding to the determined direction towards the desired geographical destination so that the user hears sound arriving from the determined direction.

In absence of GPS-signal, e.g. when buildings or terrain block the satellite signals, the personal navigation system may continue its operation relying on data from the inertial measurement unit of the hearing device utilising dead reckoning as is well-known from Inertial navigation systems in general. The processor uses information from gyros and accelerometers of the inertial measurement unit of the hearing device to calculate speed and direction of travel as a function of time and integrates to determine geographical positions of the user with the latest determined position based on GPS-signals as a starting point, until appropriate GPS-signal reception is resumed.

In accordance with some embodiments, a navigation system includes a hearing device configured to be head worn and having loudspeakers for emission of sound towards ears of a user; a GPS unit for determining a geographical position of the system; a sound generator connected for outputting audio signals to the loudspeakers; and a processor configured for selecting Points-Of-Interest in a vicinity of the system, and controlling the sound generator to output the audio signals that represents spoken information on the selected Points-Of-Interest in sequence.

In accordance with other embodiments, a method of navigation includes: determining a geographical position of a person with a GPS unit; selecting Points-Of-Interests in a vicinity of the user; and controlling a loudspeaker worn by the user to output spoken information on the selected Points-Of-Interests.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of the scope of the claims. Below, the embodiments will be described in more detail with reference to the drawings, wherein FIG. 3 shows (a) head pitch and (b) head roll.

DETAILED DESCRIPTION

Figure 1:
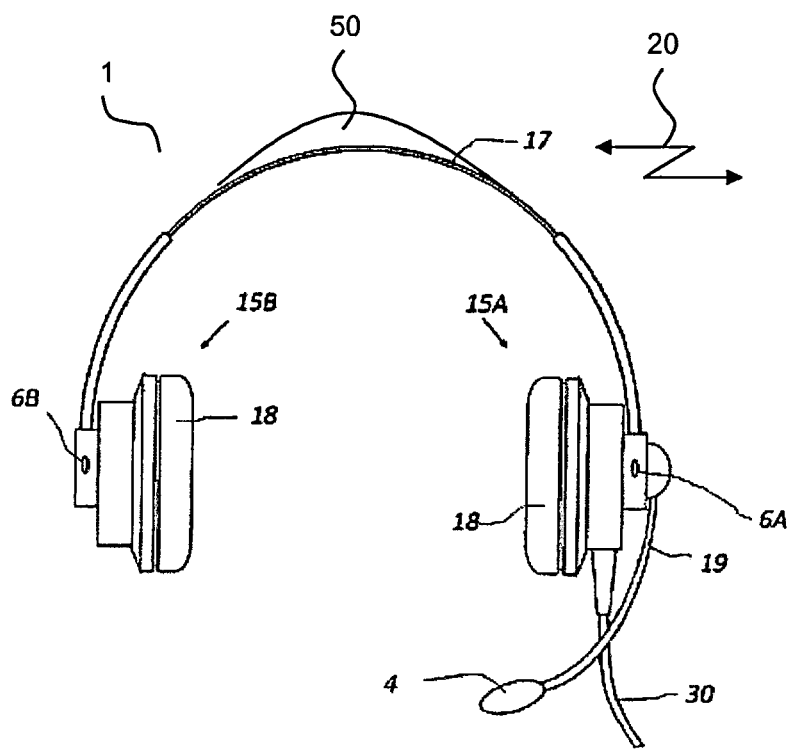
FIG. 1 shows a hearing device with an inertial measurement unit.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or explicitly described.

The new personal navigation system 10 will now be described more fully hereinafter with reference to the accompanying drawings, in which various embodiments are shown. The new personal navigation system 10 may be embodied in different forms not shown in the accompanying drawings and should not be construed as limited to the embodiments and examples set forth herein.

FIG. 1 shows an exemplary hearing device 12 of the personal navigation system 10, having a headband 17 carrying two earphones 15A, 15B similar to a conventional corded headset with two earphones 15A, 15B interconnected by a headband 17.

Each earphone 15A, 15B of the illustrated hearing device 12 comprises an ear pad 18 for enhancing the user comfort and blocking out ambient sounds during listening or two-way communication.

A microphone boom 19 with a voice microphone 4 at the free end extends from the first earphone 15A. The microphone 4 is used for picking up the user's voice e.g. during two-way communication via a mobile phone network and/or for reception of user commands to the personal navigation system 10.

The housing of the first earphone 15A comprises a first ambient microphone 6A and the housing of the second earphone 15B comprises a second ambient microphone 6B.

The ambient microphones 6A, 6B are provided for picking up ambient sounds, which the user can select to mix with the sound received from a hand-held device 14 (not shown), e.g. a mobile phone, a media player, such as an Ipod, a GPS-unit, a smart phone, a remote control for the hearing device 12, etc.

The user can select to mix ambient sounds picked up by the ambient microphones 6A, 6B with sound received from the hand-held device 14 (not shown) as already mentioned.

When mixed-in, sound from the first ambient microphone 6A is directed to the speaker of the first earphone 15A, and sound from the second ambient microphone 6B is directed to the speaker of the second earphone 15B.

A cord 30 extends from the first earphone 15A to the hand-held device 14 (not shown).

A Bluetooth transceiver in the earphone 15 is wirelessly connected by a Bluetooth link 20 to a Bluetooth transceiver in the hand-held device 14 (not shown).

The cord 30 may be used for transmission of audio signals from the microphones 4, 6A, 6B to the hand-held device 14 (not shown), while the Bluetooth network may be used for data transmission of data from the inertial measurement unit to the hand-held device 14 (not shown) and commands from the hand-held device 14 (not shown) to the hearing device 12, such as turn a selected microphone 4, 6A, 6B on or off.

A similar hearing device 12 may be provided without a Bluetooth transceiver so that the cord 30 is used for both transmission of audio signals and data signals; or, a similar hearing device 12 may be provided without a cord, so that a Bluetooth network is used for both transmissions of audio signals and data signals.

A similar hearing device 12 may be provided without the microphone boom 19, whereby the microphone 4 is provided in a housing on the cord as is well-known from prior art headsets.

A similar hearing device 12 may be provided without the microphone boom 19 and microphone 4 functioning as a headphone instead of a headset.

An inertial measurement unit 50 is accommodated in a housing mounted on or integrated with the headband 17 and interconnected with components in the earphone housing 16 through wires running internally in the headband 17 between the inertial measurement unit 50 and the earphone 15.

The user interface of the hearing device 12 is not visible, but may include one or more push buttons, and/or one or more dials as is well-known from conventional headsets.

The orientation of the head of the user is defined as the orientation of a head reference coordinate system with relation to a reference coordinate system with a vertical axis and two horizontal axes at the current location of the user.

Figure 2:
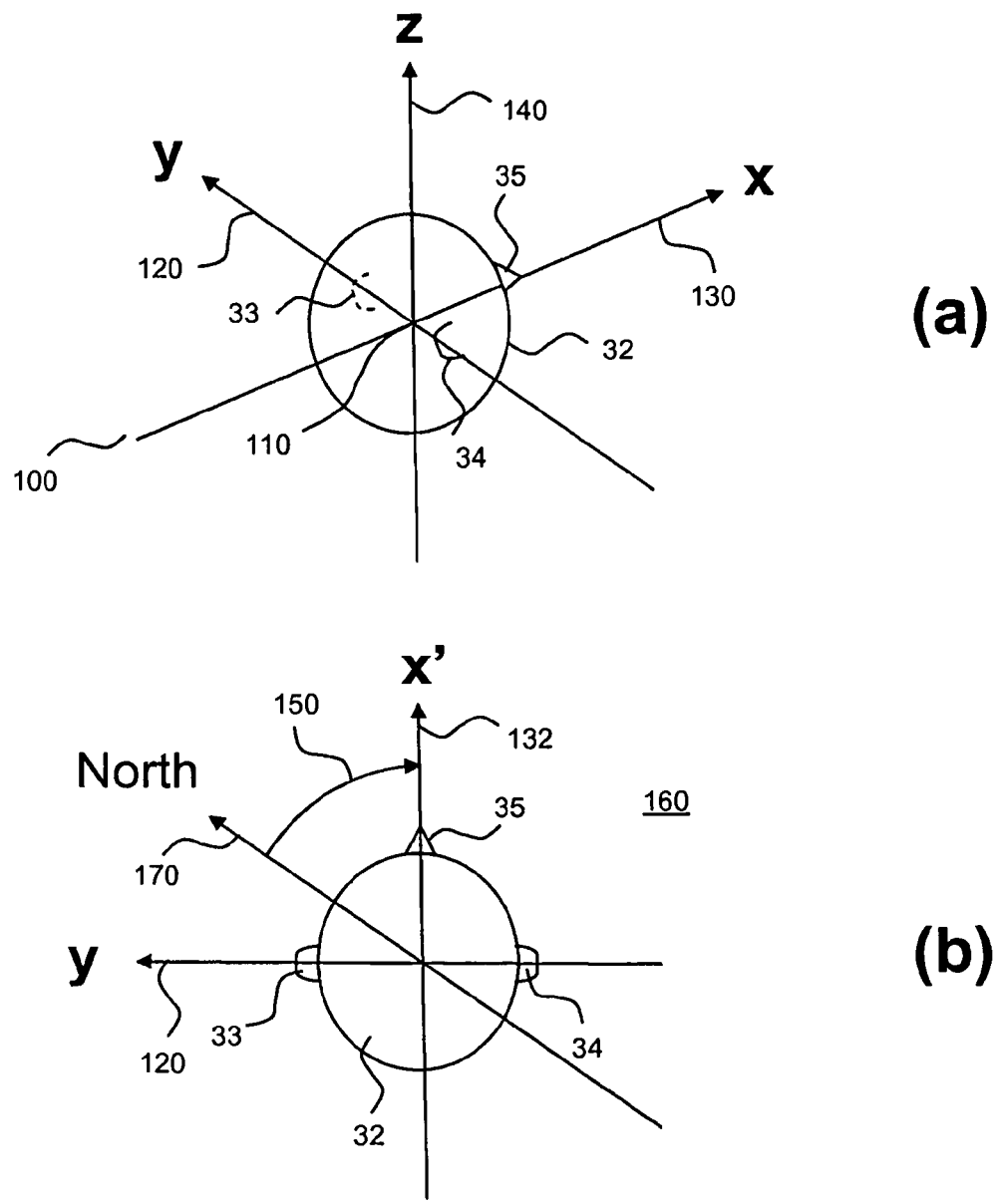
FIG. 2 shows (a) a head reference coordinate system and (b) head yaw.

FIG. 2(a) shows a head reference coordinate system 100 that is defined with its centre 110 located at the centre of the user's head 32, which is defined as the midpoint 110 of a line 120 drawn between the respective centres of the eardrums (not shown) of the left and right ears 33, 34 of the user.

The x-axis 130 of the head reference coordinate system 100 is pointing ahead through a centre of the nose 35 of the user, its y-axis 112 is pointing towards the left ear 33 through the centre of the left eardrum (not shown), and its z-axis 140 is pointing upwards.

FIG. 2(b) illustrates the definition of head yaw 150. Head yaw 150 is the angle between the current x-axis' projection x' 132 onto a horizontal plane 160 at the location of the user, and a horizontal reference direction 170, such as Magnetic North or True North.

FIG. 3(a) illustrates the definition of head pitch 180. Head pitch 180 is the angle between the current x-axis 130 and the horizontal plane 160.

FIG. 3(b) illustrates the definition of head roll 190. Head roll 190 is the angle between the y-axis and the horizontal plane.

Figure 4:
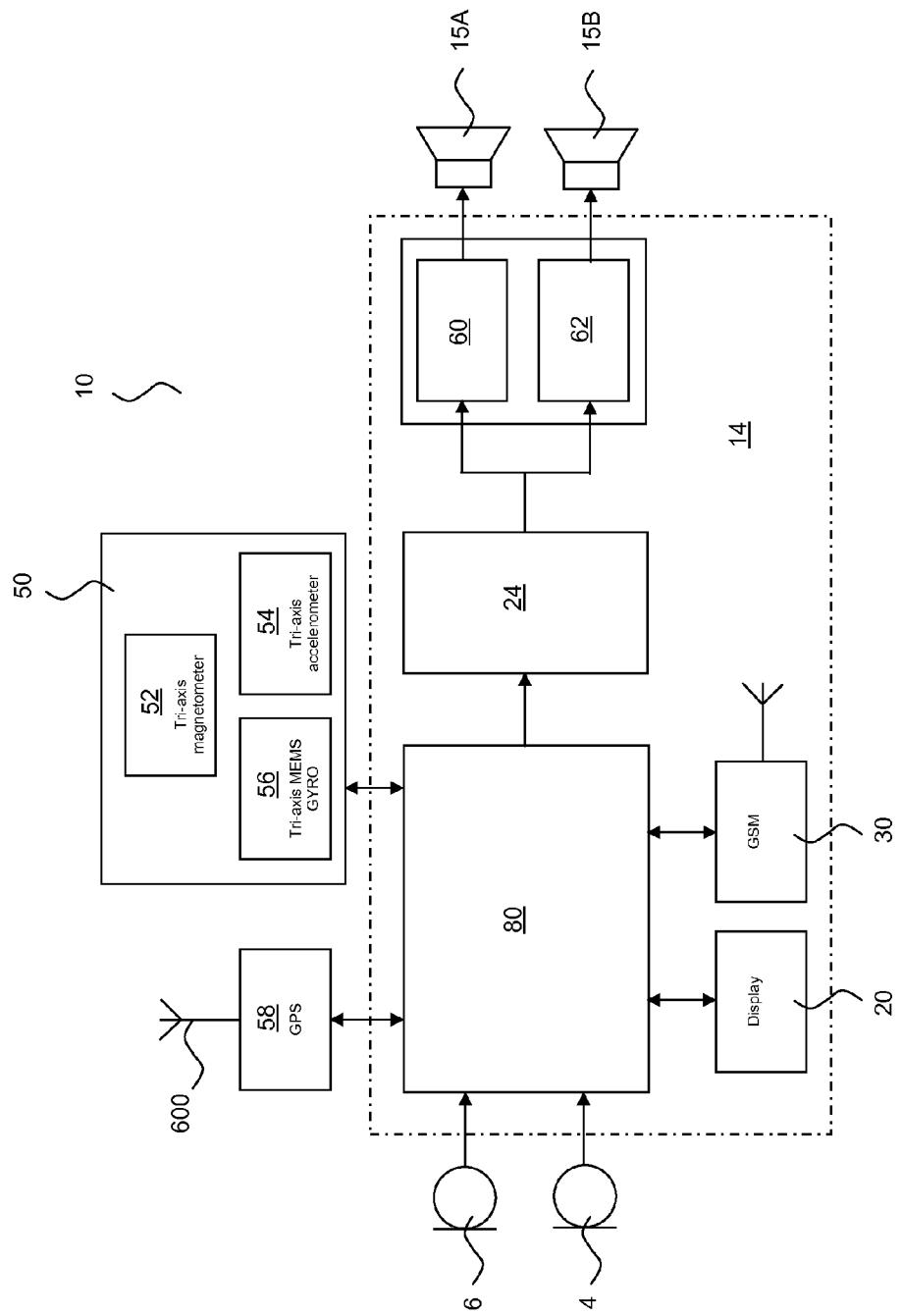
FIG. 4 is a block diagram of one embodiment of the new personal navigation system.

FIG. 4 shows a block diagram of a new personal navigation system 10 comprising a hearing device 12 and a hand-held device 14.

The various components of the system 12 may be distributed otherwise between the hearing device 12 and the hand-held device 14. For example, the hand-held device 14 may accommodate the GPS-receiver 58. Another system 10 may not have a hand-held device 14 so that all the components of the system 10 are accommodated in the hearing device 12. The system 10 without a hand-held device 14 does not have a display, and speech synthesis is used to issue messages and instructions to the user and speech recognition is used to receive spoken commands from the user.

The illustrated personal navigation system 10 comprises a hearing device 12 comprising electronic components including two loudspeakers 15A, 15B for emission of sound towards the ears of the user (not shown), when the hearing device 12 is worn by the user in its intended operational position on the user's head.

It should be noted that in addition to the hearing device 12 shown in FIG. 1, the hearing device 12 may be of any known type including an Ear-Hook, In-Ear, On-Ear, Over-the-Ear, Behind-the-Neck, Helmet, Headguard, etc, headset, headphone, earphone, ear defenders, earmuffs, etc.

Further, the hearing device 12 may be a binaural hearing aid, such as a BTE, a RIE, an ITE, an ITC, a CIC, etc, binaural hearing aid.

The illustrated hearing device 12 has a voice microphone 4 e.g. accommodated in an earphone housing or provided at the free end of a microphone boom mounted to an earphone housing.

The hearing device 12 further has one or two ambient microphones 6A, 6B, e.g. at each ear, for picking up ambient sounds.

The hearing device 12 has an inertial measurement unit 50 positioned for determining head yaw, head pitch, and head roll, when the user wears the hearing device 12 in its intended operational position on the user's head.

The illustrated inertial measurement unit 50 has tri-axis MEMS gyros 56 that provide information on head yaw, head pitch, and head roll in addition to tri-axis accelerometers 54 that provide information on three dimensional displacement of the hearing device 12.

The hearing device 12 also has a GPS-unit 58 for determining the geographical position of the user, when the user wears the hearing device 12 in its intended operational position on the head, based on satellite signals in the well-known way. Hereby, the user's current position and orientation can be provided to the user based on data from the hearing device 12.

Optionally, the hearing device 12 accommodates a GPS-antenna configured for reception of GPS-signals, whereby reception of GPS-signals is improved in particular in urban areas where, presently, reception of GPS-signals can be difficult.

In a hearing device 12 without the GPS-unit 58, the hearing device 12 has an interface for connection of the GPS-antenna with an external GPS-unit, e.g. a hand-held GPS-unit, whereby reception of GPS-signals by the hand-held GPS-unit is improved in particular in urban areas where, presently, reception of GPS-signals by hand-held GPS-units can be difficult.

The illustrated inertial measurement unit 50 also has a magnetic compass in the form of a tri-axis magnetometer 52 facilitating determination of head yaw with relation to the magnetic field of the earth, e.g. with relation to Magnetic North.

The hand-held device 14 of the personal navigation system 10 has a processor 80 with input/output ports connected to the sensors of the inertial measurement unit 50, and configured for determining and outputting values for head yaw, head pitch, and head roll, when the user wears the hearing device 12 in its intended operational position on the user's head.

The processor 80 may further have inputs connected to accelerometers of the inertial measurement unit, and configured for determining and outputting values for displacement in one, two or three dimensions of the user when the user wears the hearing device 12 in its intended operational position on the user's head, for example to be used for dead reckoning in the event that GPS-signals are lost.

Thus, the illustrated personal navigation system 10 is equipped with a complete attitude heading reference system (AHRS) for determination of the orientation of the user's head that has MEMS gyroscopes, accelerometers and magnetometers on all three axes. The processor provides digital values of the head yaw, head pitch, and head roll based on the sensor data.

The hearing device 12 has a data interface 20 for transmission of data from the inertial measurement unit to the processor 80 of the hand-held device 14, e.g. a smart phone with corresponding data interface. The data interface 20 is a Bluetooth Low Energy interface.

The hearing device 12 further has a conventional wired audio interface 28 for audio signals from the voice microphone 4, and for audio signals to the loudspeakers 15A, 15B for interconnection with the hand-held device 14 with corresponding audio interface 28.

This combination of a low power wireless interface for data communication and a wired interface for audio signals provides a superior combination of high quality sound reproduction and low power consumption of the personal navigation system 10.

The hearing device 12 has a user interface 21, e.g. with push buttons and dials as is well-known from conventional headsets, for user control and adjustment of the hearing device 12 and possibly the hand-held device 14 interconnected with the hearing device 12, e.g. for selection of media to be played.

The hand-held device 14 receives head yaw from the inertial measurement unit of the hearing device 12 through the Bluetooth Low Energy wireless interface. With this information, the hand-held device 14 can display maps on its display in accordance with orientation of the head of the user as projected onto a horizontal plane, i.e. typically corresponding to the plane of the map. For example, the map may automatically be displayed with the position of the user at a central position of the display, and the current head x-axis pointing upwards.

The user may use the user interface of the hand-held device 14 to input information on a geographical position the user desires to visit in a way well-known from prior art hand-held GPS-units.

The hand-held device 14 may display maps with a suggested route to the desired geographical destination as a supplement to the aural guidance provided through the hearing device 12.

The hand-held device 14 may further transmit spoken guiding instructions to the hearing device 12 through the audio interface 28 as is well-known in the art, supplementing the other audio signals provided to the hearing device 12.

In addition, the microphone of hearing device 12 may be used for reception of spoken commands by the user, and the processor 80 may be configured for speech recognition, i.e. decoding of the spoken commands, and for controlling the personal navigation system 10 to perform actions defined by respective spoken commands.

The hand-held device 14 filters the output of a sound generator 24 of the hand-held device 14 with a pair of filters 60, 62 with an HRTF into two output audio signals, one for the left ear and one for the right ear, corresponding to the filtering of the HRTF of a direction in which the user should travel in order to visit a desired geographical destination.

This filtering process causes sound reproduced by the hearing device 12 to be perceived by the user as coming from a sound source localized outside the head from a direction corresponding to the HRTF in question, i.e. from a virtual sonar beacon located at the desired geographical destination.

In this way, the user is relieved from the task of watching a map in order to follow a suitable route towards the desired geographical destination.

The user is also relieved from listening to spoken commands intending to guide the user along a suitable route towards the desired geographical destination.

Further, the user is free to explore the surroundings and for example walk along certain streets as desired, e.g. act on impulse, while listening to sound perceived to come from the direction toward the desired geographical destination (also) to be visited, whereby the user is not restricted to follow a specific route determined by the personal navigation system 10.

The sound generator 24 may output audio signals representing any type of sound suitable for this purpose, such as speech, e.g. from an audio book, radio, etc, music, tone sequences, etc.

The user may for example decide to listen to a radio station while walking, and the sound generator 24 generates audio signals reproducing the signals originating from the desired radio station filtered by pair of filters 60, 62 with the HRTFs in question, so that the user perceives to hear the desired music from the direction towards the desired geographical destination to be visited at some point in time.

At some point in time, the user may decide to follow a certain route determined and suggested by the personal navigation system 10, and in this case the processor controls the HRTF filters so that the audio signals from the sound generator 24 are filtered by HRTFs corresponding to desired directions along streets or other paths along the determined route. Changes in indicated directions will be experienced at junctions and may be indicated by increased loudness or pitch of the sound. Also in this case, the user is relieved from having to visually consult a map in order to be able to follow the determined route.

In the event that the processor controls the sound generator 24 to output a tone sequence, e.g. of the same frequency, the frequency of the tones may be increased or decreased with distance to the desired geographical destination. Alternatively, or additionally, the repetition rate of the tones may be increased or decreased with distance to the desired geographical destination.

The personal navigation system 10 may be operated without using the visual display, i.e. without the user consulting displayed maps, rather the user specifies desired geographical destinations with spoken commands and receives aural guidance by sound emitted by the hearing device 12 in such a way that the sound is perceived by the user as coming from the direction towards the desired geographical destination.

Figure 5:
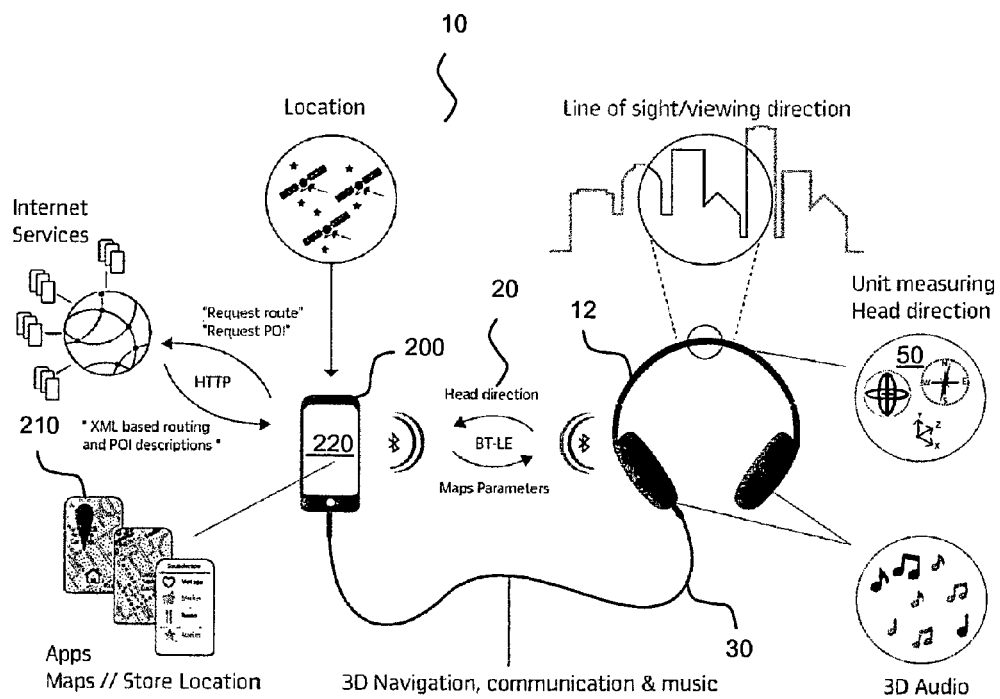
FIG. 5 illustrates one exemplary use of the new personal navigation system, and FIG. 6 schematically illustrates the operation of the system, FIG. 7 schematically illustrates an example of the operation of the system, and FIG. 8 schematically illustrates another example of the operation of the system.

FIG. 5 illustrates the configuration and operation of an example of the new personal navigation system 10 shown in FIG. 4, with the hearing device 12 together with a hand-held device 14, which in the illustrated example is a smart phone 200, e.g. an Iphone, an Android phone, etc, with a personal navigation app containing instructions for the processor of the smart phone to perform the operations of the processor 80 of the personal navigation system 10 and of the pair of filters 60, 62 with an HRTF. The hearing device 12 is connected to the smart phone 200 with a chord 30 providing a wired audio interface 28 between the two units 10, 200 for transmission of speech and music from the smart phone 200 to the hearing device 12, and speech from the voice microphone 4 (not shown) to the smart phone 200 as is well-known in the art.

As indicated in FIG. 5 by the various exemplary GPS-images 210 displayed on the smart phone display 220, the personal navigation app is executed by the smart phone in addition to other tasks that the user selects to be performed simultaneously by the smart phone 200, such as playing music, and performing telephone calls when required.

The personal navigation app configures the smart phone 200 for data communication with the hearing device 12 through a Bluetooth Low Energy wireless interface 20 available in the smart phone 200 and the hearing device 12, e.g. for reception of head yaw from the inertial measurement unit 50 of the hearing device 12. In this way, the personal navigation app can control display of maps on the display of the smart phone 200 in accordance with orientation of the head of the user as projected onto a horizontal plane, i.e. typically corresponding to the plane of the map. For example, the map may be displayed with the position of the user at a central position of the display, and the head x-axis pointing upwards.

The personal navigation system 10 operates to position a virtual sonar beacon at a desired geographical location, whereby a guiding sound signal is transmitted to the ears of the user that is perceived by the user to arrive from a certain direction in which the user should travel in order to visit the desired geographical location. The guiding sound is generated by a sound generator 24 of the smart phone 200, and the output of the sound generator 24 is filtered in parallel with the pair of filters 60, 62 of the smart phone 200 having an HRTF so that an audio signal for the left ear and an audio signal for the right ear are generated. The filter functions of the two filters approximate the HRTF corresponding to the direction from the user to the desired geographical location taking the yaw of the head of the user into account.

The user may calibrate directional information by indicating when his or her head x-axis is kept in a known direction, for example by pushing a certain push button when looking due North, typically True North. The user may obtain information on the direction due True North, e.g. from the position of the Sun on a certain time of day, or the position of the North Star, or from a map, etc.

The user may calibrate directional information by indicating when his or her head x-axis is kept in a known direction, for example by pushing a certain push button when looking due North, typically True North. The user may obtain information on the direction due True North, e.g. from the position of the Sun on a certain time of day, or the position of the North Star, or from a map, etc.

At any time during use of the personal navigation system, the user may use the user interface to request a sequential spoken presentation of POIs proximate the user, e.g. by pushing a specific button located at the hearing device 12.

Figure 6:
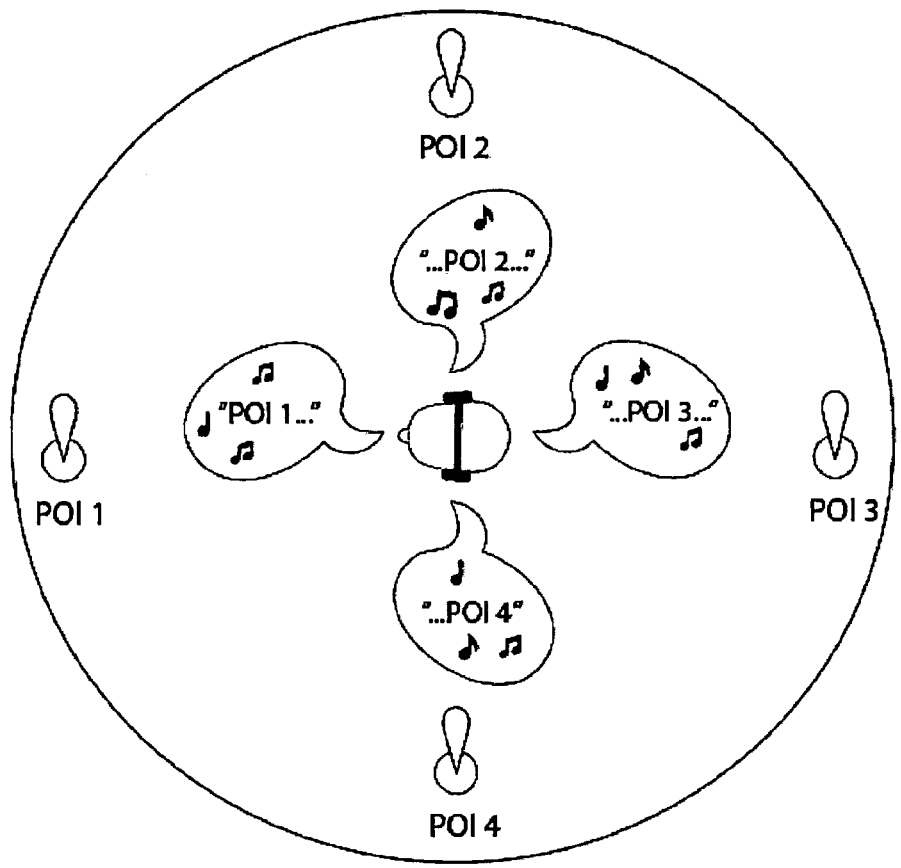

For example, the user may arrive at a town square as schematically illustrated in FIG. 6, with various POIs. As indicated in FIG. 6, the user has requested the personal navigation system 10 to provide an introduction to POIs at the town square, and possibly, the user has specified the types of POIs to be included in the introduction, e.g. historical sites. In response to the user request, the personal navigation system has identified the historical POIs at or proximate the town square and sequentially narrates information on the identified POIs 1, 2, 3, and 4.

The narrated information is communicated with the hearing device, preferably with a sense of direction so that narrated information relating to a specific site proximate the user will be perceived by the user to be emitted by a sound source located at the site in question so that the narrator will sequentially be perceived to be positioned at the respective POIs.

In this way, the user is provided with spatial knowledge about the surroundings and the need to visually consult a display of the surroundings is minimized making it easy and convenient for the user to navigate to geographical locations, the user desires to see or visit.

During or after the narrated presentation, the user may request the personal navigation system to guide the user to a selected geographical position, such as a selected POI from the POIs just presented in sequence to the user. The processor will then determine a direction towards a selected geographical destination and guide the user towards that geographical destination as previously described.

The smart phone 200 may contain a database of POIs as is way well-known in conventional smart phones.

Some or all of the POI records of the database of the personal navigation system include audio files with spoken information on the respective POI.

Alternatively, or additionally, the personal navigation system may have access to remote servers hosting databases on POIs, e.g. through a Wide-Area-Network, or a Local Area Network, e.g. providing access to the Internet.

Thus, the personal navigation system may have a wireless antenna, transmitter, and receiver for communicating over a wireless network with a remote server accommodating a database with information on POIs, e.g. including audio files with spoken information on some or all of the POIs. The wireless network may be a mobile telephone network, such as a GSM network.

The wireless network may provide a link through an Internet gateway to the Internet.

The personal navigation system may transmit the current position of the system to the remote server and requesting information on nearby POIs, preferably of one or more selected categories, and preferably sequenced in accordance with a selected rule of priority, such as proximity, popularity, user ratings, professional ratings, cost of entrance, opening hours with relation to actual time, etc. A maximum number of POIs may also be specified.

The server searches for matching POIs and transmits the matching records, e.g. including audio files, to the personal navigation system that sequentially presents spoken information on the matching POIs with the hearing instrument.

The spoken information may include opening hours of POIs, time table of upcoming venues of POIs, etc.

The smart phone may be configured request navigation tasks to be performed by a remote navigation enabled server whereby the smart phone communicates position data of the current position, e.g. current longitude, latitude; or, the received satellite signals, and position data of a destination, e.g. longitude, latitude; or street address, etc., to the navigation enabled server that performs the requested navigation tasks and transmits resulting data to the smart phone for presentation to the user.

Figure 7:
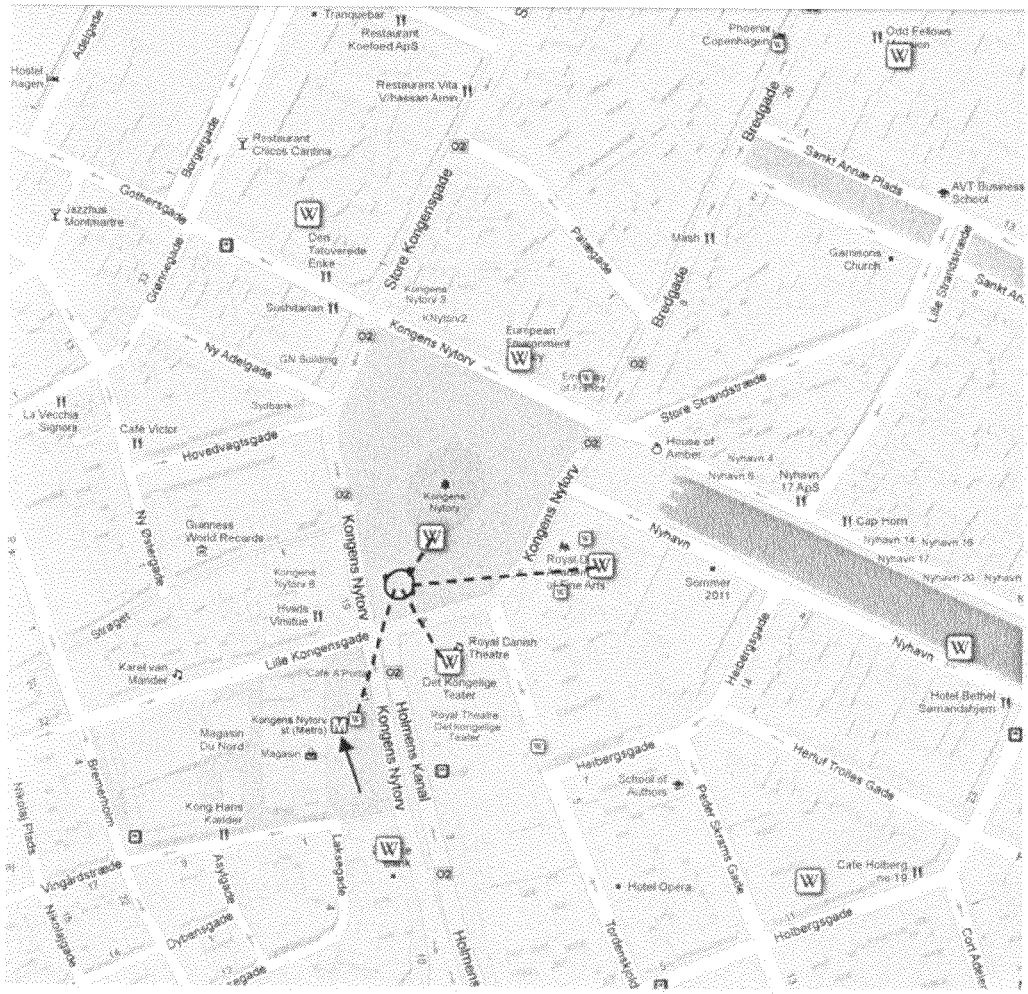

FIG. 7 illustrates an example of use of the personal navigation system, where the user has taken the metro (metro station indicated by an arrow) to the town square: "Kongens Nytorv" in Copenhagen. The user has walked from the metro station to the town square and is presently looking at the statue located at the centre of the square as indicated in FIG. 7. The user has requested a presentation of nearby POIs made available on the Internet by Wikipedia. The available POIs are indicated by capital letter W in a square frame. Short text introductions to the available POIs are acquired from Wikipedia by the personal navigation system and converted into speech by the text-to-speech converter of the smart phone.

The presentations are prioritized by proximity, i.e. the POI closest to the user is presented first, then the second closest POI, etc.

As indicated by the dashed line, the user perceives to hear the presentations made by a narrator positioned at the respective POIs whereby the user is informed on the directions towards each of the presented POIs.

In the illustrated example, the user has limited the number of presented POIs to four.

Figure 8:
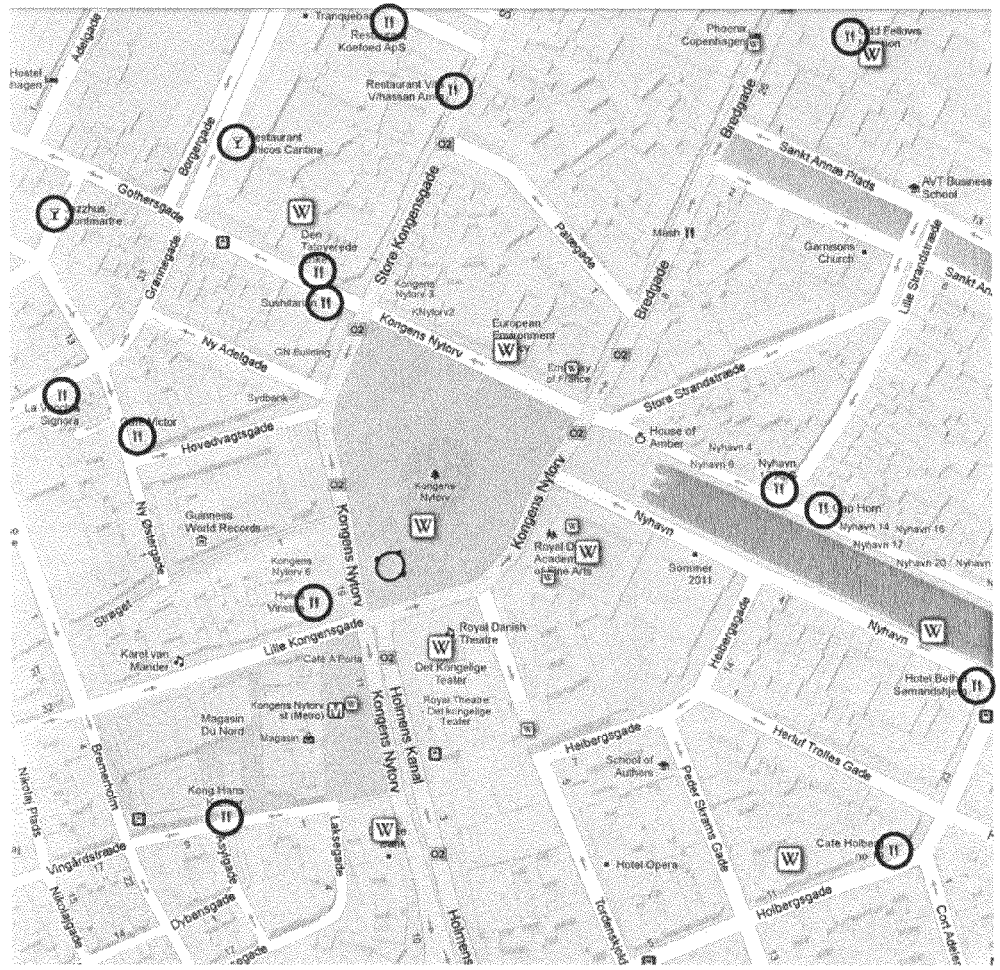

FIG. 8 illustrates that the user subsequently to the presentation of historical sites at the square, has requested the personal navigation system to present nearby restaurants (indicated in circles) as provided by another organisation, e.g. The official tourism site of Denmark, or, the Michelin Guide, etc.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A navigation system comprising:
    a hearing device configured to be head worn and having speakers for emission of sound towards ears of a user;
    a GPS unit for determining a geographical position of the system;
    a sound generator connected for outputting audio signals to the speakers;
    a processor configured for:
        selecting Points-Of-Interest in a vicinity of the system, and
        controlling the sound generator to output the audio signals that represents spoken information on the selected Points-Of-Interest in sequence; and
    a pair of filters with a Head-Related Transfer Function connected in parallel between the sound generator and the speakers for generation of binaural acoustic sound signals emitted towards eardrums of the user so that the binaural acoustic sound signals can be perceived by the user as coming from a sound source positioned in a direction corresponding to the Head-Related Transfer Function.

2. The navigation system according to claim 1, wherein the hearing device accommodates an inertial measurement unit for determining head yaw, when the user wears the hearing device in its intended operational position on a head of the user; and
    the processor is configured for
        determining respective directions towards the selected Points-Of-Interest with relation to the determined geographical position and the head yaw of the user,
        selecting respective Head-Related Transfer Functions corresponding to the determined directions, and
        controlling the sound generator for sequentially outputting the audio signals that represent the spoken information on the selected Points-Of-Interest in sequence through the pair of filters with the selected respective Head-Related Transfer Functions so that the user hears the spoken information on the Points-Of-Interest sequentially from the respective directions towards the Points-Of-Interest.

3. The navigation system according to claim 1, wherein the selected Points-Of-Interest are selected from a subset of Points-Of-Interest specified by the user.

4. The navigation system according to claim 1, further comprising a database with information on Points-Of-Interest.

5. The navigation system according to claim 1, further comprising an interface for connection with a Wide-Area-Network.

6. The navigation system according to claim 5, wherein the processor is configured for requesting information on one of the Points-Of-Interest via the Wide-Area-Network and for receiving the requested information via the Wide-Area-Network.

7. The navigation system according to claim 1, wherein the processor is configured to perform word recognition and to perform speech synthesis for generation of the audio signals that represent spoken information on the selected Points-Of-Interest based on text information on the selected Points-Of-Interest.

8. The navigation system according to claim 1, further comprising a user interface configured for reception of spoken user commands.

9. The navigation system according to claim 1, further comprising a hand-held device communicatively coupling with the hearing device.

10. The navigation system according to claim 9, wherein the hand-held device accommodates the sound generator and the pair of filters with Head-Related Transfer functions.

11. The navigation system according to claim 9, wherein the hand-held device accommodates a user interface configured for reception of spoken user commands.

12. The navigation system according to claim 9, wherein the hand-held device comprises a display, and a processor configured to display a map on the display with an indication of the determined geographical position and a head yaw of the user, and icons of the selected Points-Of-Interest at respective geographical positions of the selected Points-Of-Interest.

13. The navigation system according to claim 9, wherein the hand-held device accommodates the GPS unit.

14. The navigation system according to claim 9, further comprising a wireless connection for communicating signals between the hand-held device and the hearing device.

15. The navigation system according to claim 9, further comprising a wired connection for communicating signals between the hand-held device and the hearing device.

16. The navigation system according to claim 15, wherein the audio signals are transmitted from the hand-held device to the hearing device with the wired connection, and wherein sensor data is transmitted from the hearing device to the hand-held device with a wireless connection.

* * * * *